United States Patent [19]

Johnson

[11] Patent Number: 4,869,521
[45] Date of Patent: Sep. 26, 1989

[54] COLLAPSIBLE TOWING HITCH

[76] Inventor: Andrew B. Johnson, R.R. 2, Box 101, Barton, N. Dak. 58315

[21] Appl. No.: 322,303

[22] Filed: Mar. 13, 1989

[51] Int. Cl.$^4$ ............................................. B60D 1/00
[52] U.S. Cl. ................................. 280/491.1; 280/491.4
[58] Field of Search ............... 280/491.1, 491.3, 491.4, 280/491.5; 293/117

[56] References Cited

U.S. PATENT DOCUMENTS

| | | | |
|---|---|---|---|
| 2,139,970 | 12/1938 | Moore | 280/491.4 |
| 3,281,162 | 10/1966 | Carson | 280/479.3 |
| 3,384,391 | 5/1968 | Batke | 280/479.3 |
| 3,492,022 | 1/1970 | Hansen | 280/479.3 |
| 3,572,765 | 3/1971 | Tieben | 280/491.4 |
| 3,794,355 | 2/1974 | Cracolice | 280/491.4 X |
| 3,947,062 | 3/1976 | Pierce | 293/116 R |

FOREIGN PATENT DOCUMENTS 269114 4/1970 U.S.S.R. ............................ 280/491.4

Primary Examiner—Mitchell J. Hill
Attorney, Agent, or Firm—Zarley, McKee, Thomte, Voorhees & Sease

[57] ABSTRACT

A collapsible towing hitch includes a base member which is pivotally mounted to the front bumper or frame or a vehicle so as to rotate from an operable position to a storage position. A pair of spring-loaded latch pins are mounted on the base member and correspond with apertures in a pair of yoke brackets and in a pair of base member mounting brackets so as to selectively lock the base member in the storage position. A pivotal arm is mounted at each end of the base member to pivot in a generally horizontal plane when the base member is in the operating position. An elongated bar is pivotally connected to the free end of each pivotal arm, and each bar is mounted at its free end to a ball hitch housing. The pivotal connection between the elongated bars and the pivotal arms may be selectively locked in an aligned condition utilizing a pin mounted through a pair of apertures in the pivotal arms and elongated bars. In this fashion, the pins may be removed so as to pivot the pivotal arms with respect to the elongated bars and collapse the ball hitch housing into close contact with the base member. Once the ball hitch housing is collapsed against the base member, the base member is rotated and locked in an upright position for storage, such that the vehicle may be utilized in a conventional manner.

4 Claims, 5 Drawing Sheets

COLLAPSIBLE TOWING HITCH

TECHNICAL FIELD

The present invention relates generally to hitches for towing vehicles, and more particularly to an improved hitch which will collapse for easy storage on the front of the vehicle.

BACKGROUND OF THE INVENTION

Various tow bars for towing vehicles have been known for many years. However, conventional tow bars are typically bulky, heavy structures which require a fairly lengthy amount of time to install between the vehicles, and a similar amount of time to remove once the vehicle has been towed to the desired location.

Furthermore, prior art towing apparatus was designed for complete removal from the towed vehicle upon arrival at the desired location. Thus, in those instances where it is desired to use the vehicle intermittently, it is necessary to completely remove and install conventional towing apparatuses at each stop. Such a time-consuming effort is frustrating for the user, and detracts from the desirability of towing a vehicle. It is therefore a general object of the present invention to provide an improved hitch for towing vehicles or the like.

Another object of the present invention is to provide a towing hitch which is collapsible for storage on the towed vehicle.

Yet another object is to provide an improved hitch which may be quickly expanded for towing purposes, and easily collapsed to a storage position.

Still another object of the present invention is to provide a towing hitch which is easy to install on the towed vehicle.

A further object is to provide an improved hitch which is economical to manufacture, and simple to use.

These and other objects of the present invention will be apparent to those skilled in the art.

SUMMARY OF THE INVENTION

The collapsible towing hitch of the present invention includes a base member which is pivotally mounted to the front bumper or frame or a vehicle so as to rotate from an operable position to a storage position. A pair of spring-loaded latch pins are mounted on the base member and correspond with apertures in a pair of yoke brackets and in a pair of base member mounting brackets so as to selectively lock the base member in the storage position. A pivotal arm is mounted at each end of the base member to pivot in a generally horizontal plane when the base member is in the operating position. An elongated bar is pivotally connected to the free end of each pivotal arm, and each bar is mounted at its free end to a ball hitch housing. The pivotal connection between the elongated bars and the pivotal arms may be selectively locked in an aligned condition utilizing a pin mounted through a pair of apertures in the pivotal arms and elongated bars. In this fashion, the pins may be removed so as to pivot the pivotal arms with respect to the elongated bars and collapse the ball hitch housing into close contact with the base member. Once the ball hitch housing is collapsed against the base member, the base member is rotated and locked in an upright position for storage, such that the vehicle may be utilized in a conventional manner.

DESCRIPTION OF THE PREFERRED EMBODIMENT

Figure 1:
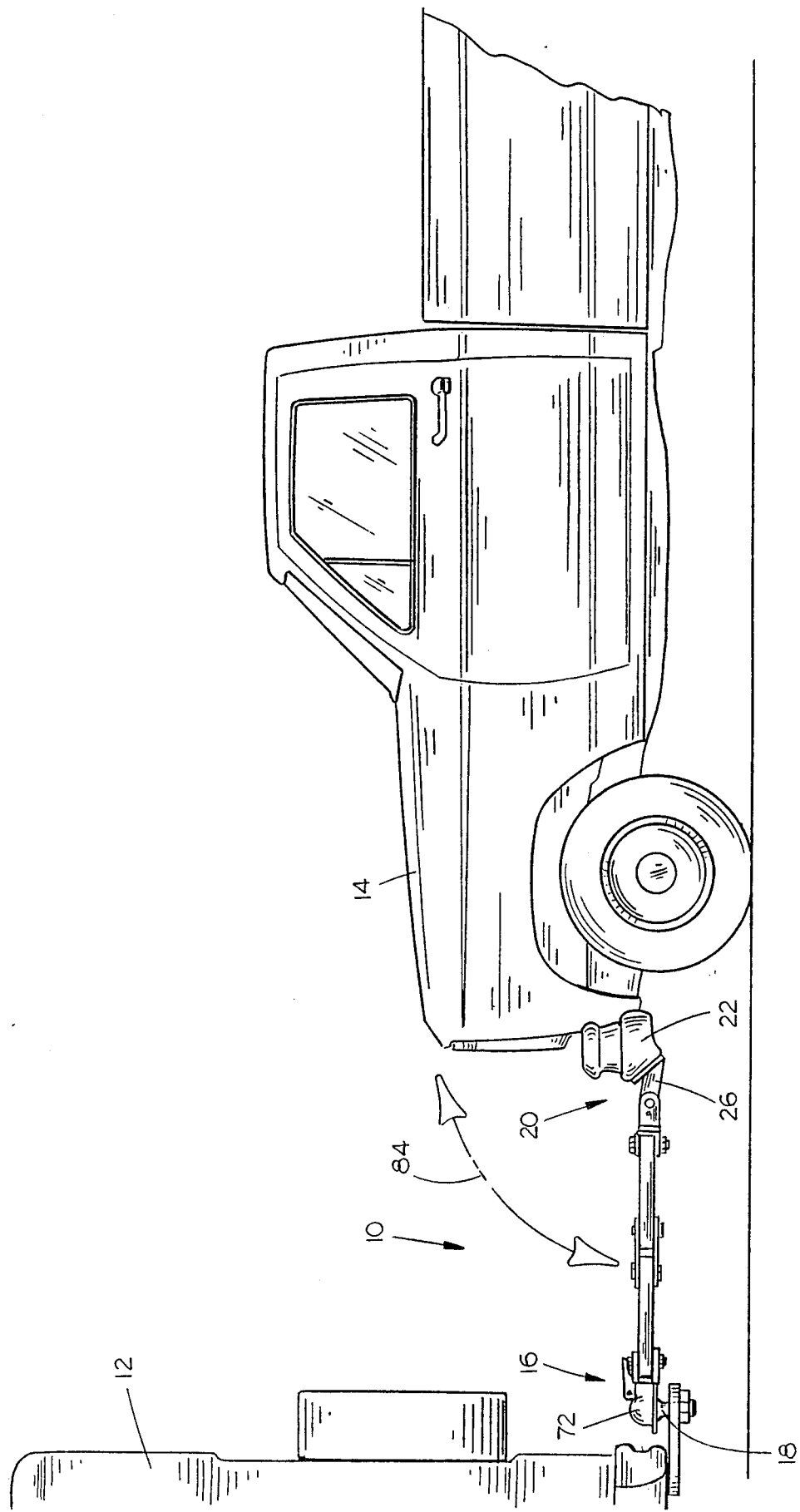
FIG. 1 is a side elevational view of the present invention mounted on a vehicle, shown towing a second vehicle.
Figure 2:
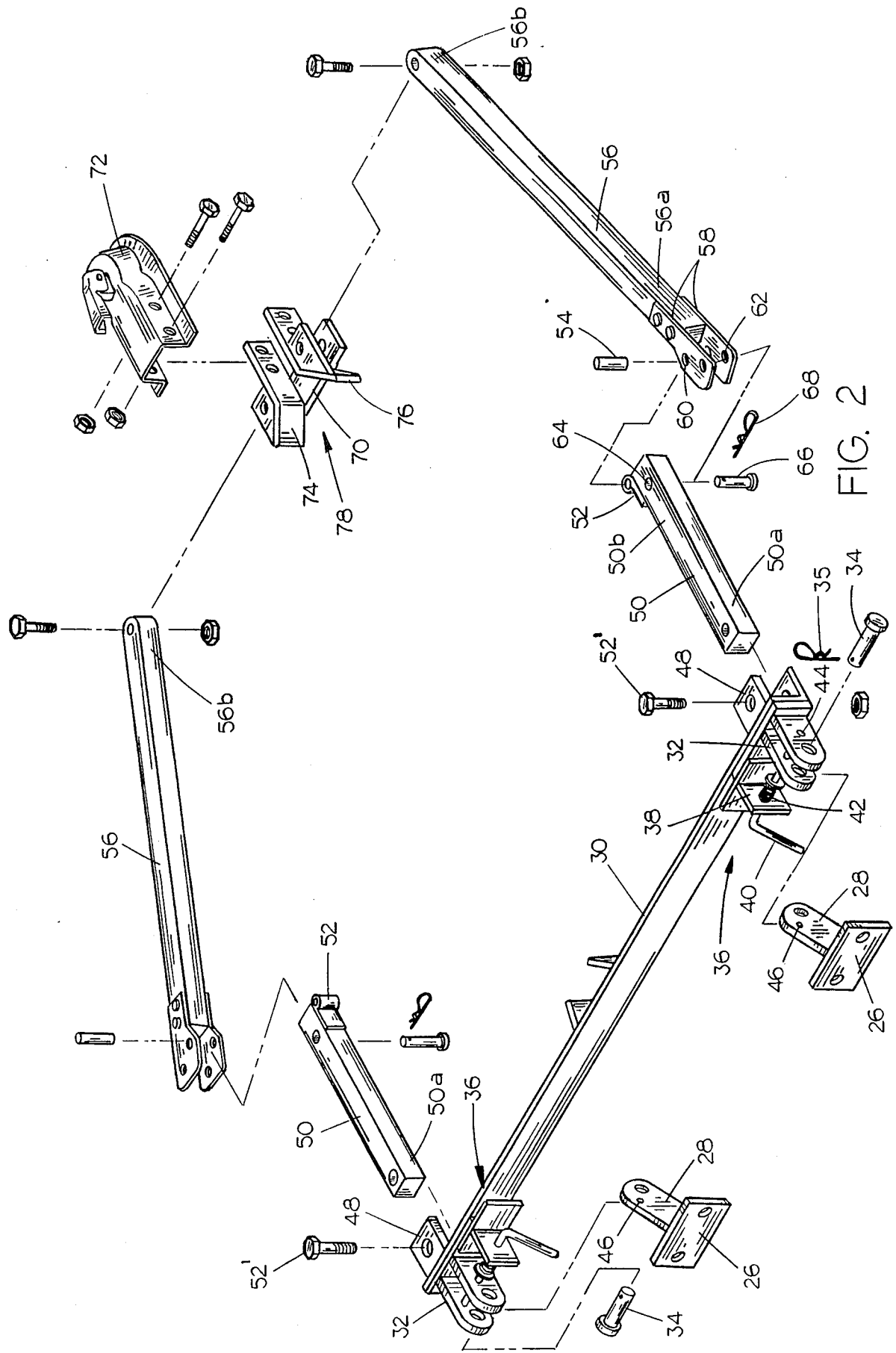
FIG. 2 is an exploded perspective view of the present invention.

Referring now to the drawings, in which similar or corresponding parts are identified with the same reference numeral, and more particularly to FIG. 1, the towing hitch of the present invention is designated generally at 10 and is shown connected between a towing vehicle 12 and a towed vehicle 14. Towing hitch 10 includes a forward portion identified generally at 16 which may be operably and removably mounted to a hitch ball 18 on the rearward end of towing vehicle 12, and a rearward portion designated generally at 20, which is attached to the towed vehicle 14. In this first embodiment of the invention, the towing hitch 10 is mounted to bumper 22 on towed vehicle 14. In a second embodiment of the invention (see FIG. 7) the towing hitch 10' is mounted directly to the frame 24 of the towed vehicle 14'.

Referring now to FIGS. 1-4, a pair of mounting brackets 26 are affixed in spaced-apart relation on bumper 22, each bracket 26 having a plate 28 projecting forwardly therefrom. A horizontally-oriented, elongated base member 30 has a yoke bracket 32 mounted at each end thereof, the yoke brackets designed to straddle plates 28 such that a pin 34 may be mounted through axial apertures in yoke brackets 32 and plates 28. Pin 34 connects base member 30 to brackets 26 for a freely pivotable mount. In this fashion, base member 30 is freely pivotable about a horizontal axis passing through pins 34.

A latch assembly 36 is mounted on base member 30 adjacent yoke brackets 32, each assembly 36 including a projecting plate 38 oriented generally parallel to yoke bracket 32, and having a spring-loaded latch pin 40 passing therethrough. Latch pin 40 has a spring 42 mounted thereon designed to bias latch pin 40 through apertures 44 in yoke bracket 32 and through an aperture 46 in plate 28 on mounting brackets 26. Aperture 46 is located on plate 28 such that it will be aligned with apertures 44 in yoke brackets 32 when towing hitch 10 is pivoted to a generally vertical position with respect to the vehicle and ground (see FIG. 3). Latch assemblies 36 thereby allow quick and easy locking of the towing hitch 10 in a vertical storage position, and quick and simple release to allow for towing.

A pair of U-brackets 48 are affixed to each end of base member 30 opposite yoke brackets 32, each U-bracket 48 receiving the rearward end 50a of a pair of pivotal arms 50 for pivotal connection thereto. A nut and bolt assembly 52' provides a vertical pivotal axis through each bracket 48 for horizontal pivotal movement of arms 50. The forward end 50b of pivotal arms 50 has a hinge collar 52 mounted thereon and oriented vertically to receive a hinge pin 54 therein. A pair of elongated bars 56 each have a pair of hinge plates 58 affixed to the upper and lower faces of the rearward end 56a thereof, for pivotal connection to pivotal arms 50. Hinge plates 58 extend rearwardly and have a pair of offset apertures 60 and 62 therethrough, the apertures in the upper and lower plates being coaxial. Apertures 60 are aligned with hinge collar 52 and receive hinge pin 54 to pivotally connect elongated bar 56 with pivotal arm 50. Apertures 62 are located so as to be aligned with an aperture 64 in forward end 50b of pivotal arm 50, when bar 56 and pivotal arm 50 are axially aligned. A bolt 56 may then be fastened through apertures 62 and 64 to lock bar 56 and pivotal arm 50 in alignment.

Figure 5:
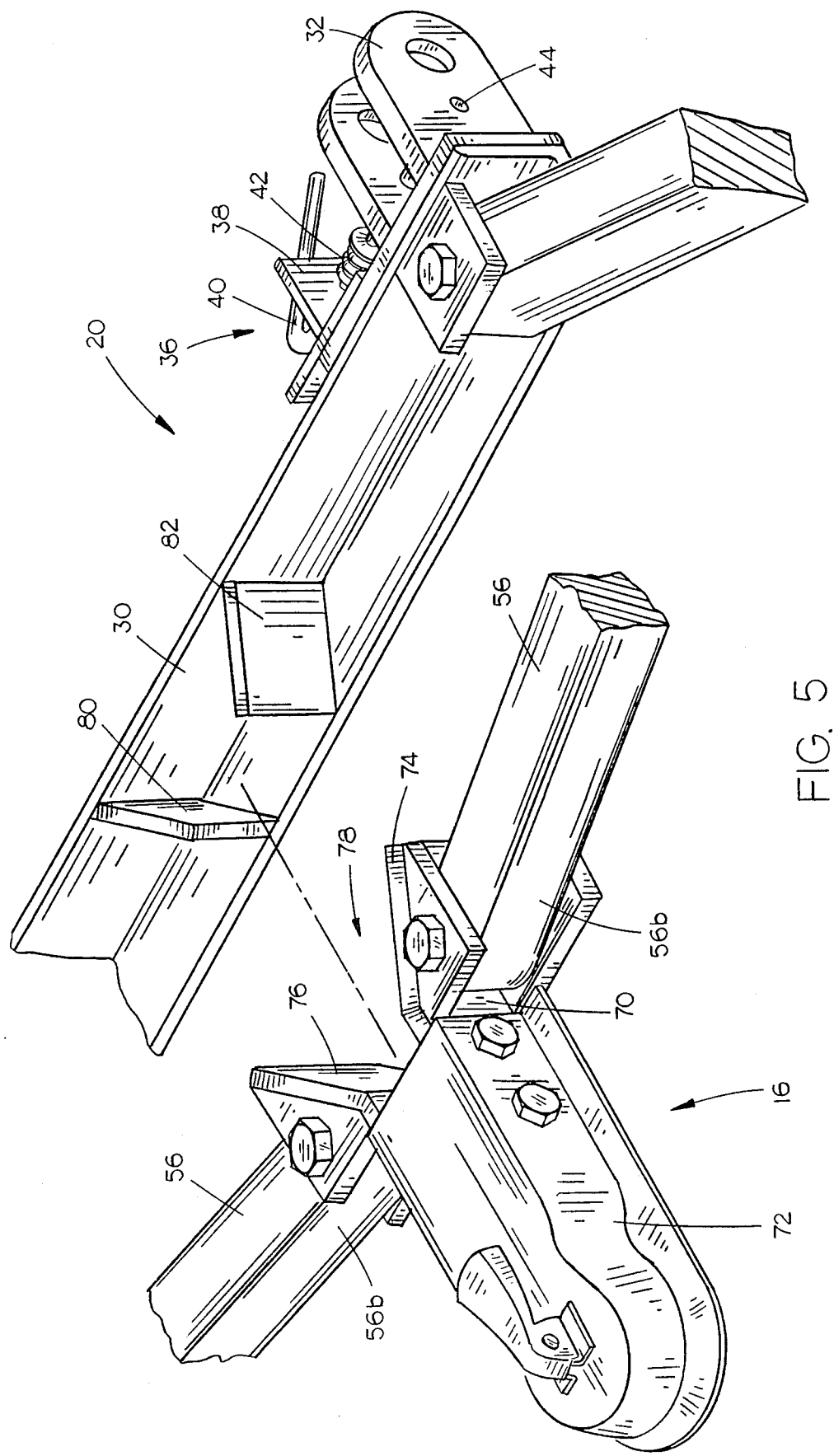
FIG. 5 is a perspective view of a portion of the invention showing details of the process of moving the hitch into a storage position.
Figure 6:
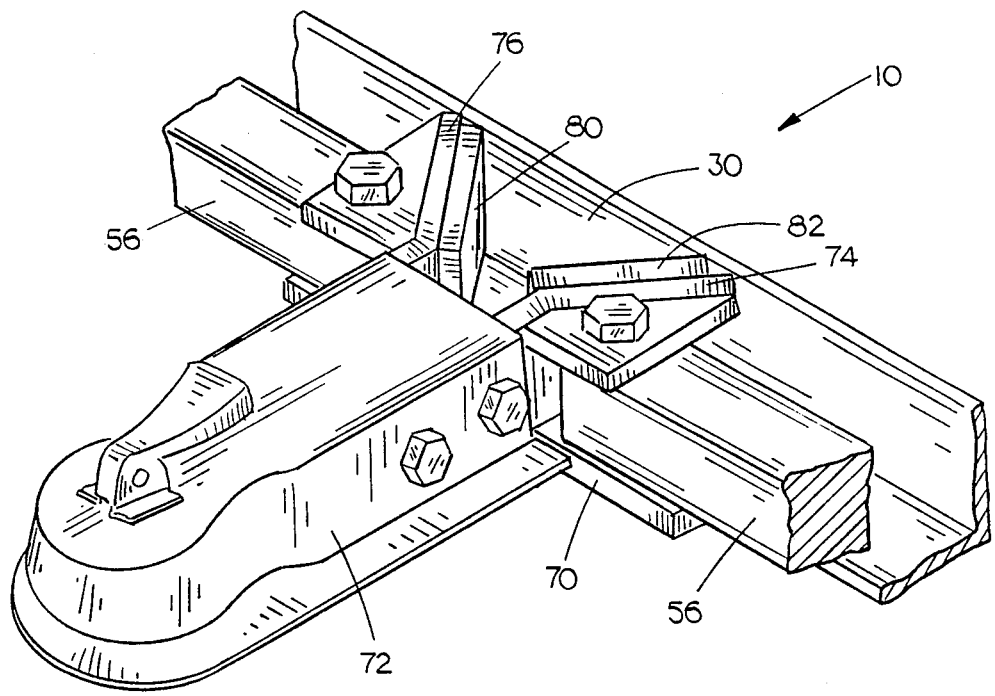
FIG. 6 is a perspective view of the same portion of the invention of FIG. 5, with the hitch in a stored position.

The forward ends 56b of elongated bars 56 are pivotally connected to an alignment bracket 70. Alignment bracket 70 is bolted to a conventional ball hitch housing 72 which is selectively lockable on a hitch ball 18 as shown in FIG. 1. A pair of vertically-oriented plates 74 and 76 are mounted on alignment bracket 70 in a spaced-apart and generally diverging orientation. A V-shaped notch is formed by plates 74 and 76, and is designated generally at 78. Notch 78 will receive a pair of plates 80 and 82 which are mounted on base member 30, in abutting contact with plates 74 and 76. As shown in FIGS. 5 and 6, plates 80 and 82 on base member 30 correspond with diverging plates 74 and 76 on alignment bracket 70.

Figure 4:
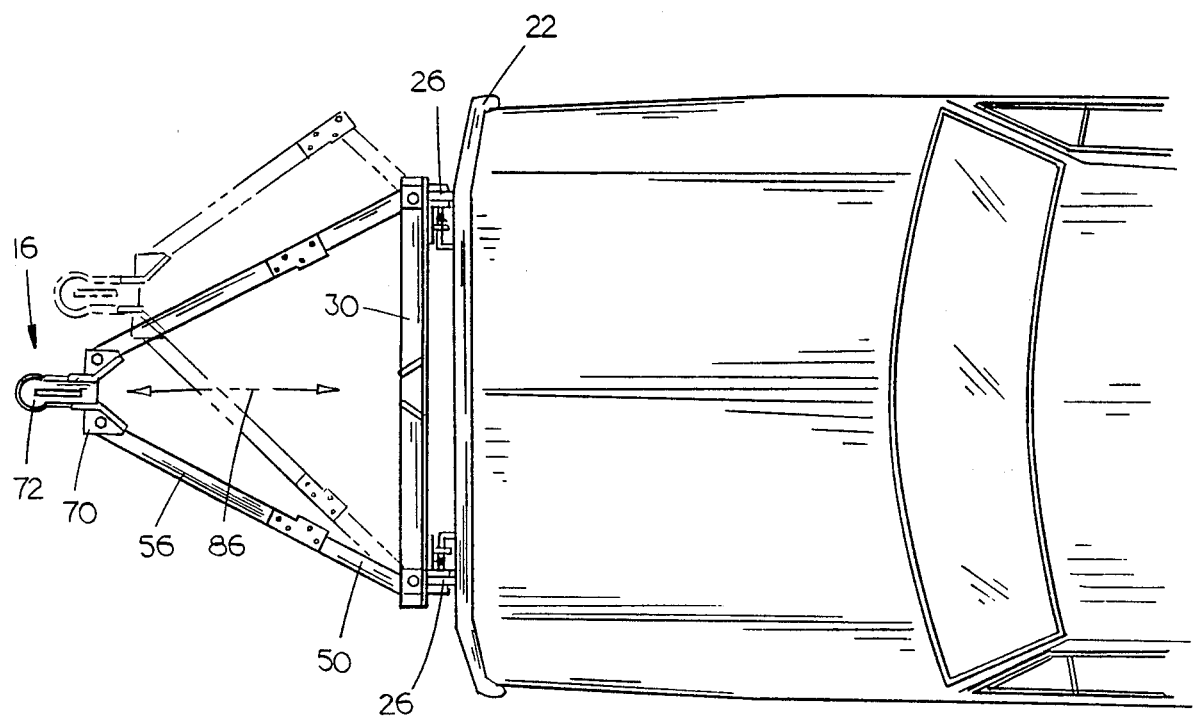
FIG. 4 is a top view of a towed vehicle with the hitch extended to a towing position.

The towing hitch 10 is mounted on the vehicle to be towed 14, by initially mounting brackets 26 onto bumper 22. Base member 30 may then be quickly and easily mounted on brackets 26, by aligning the apertures in yoke brackets 32 with the apertures in plates 28 and inserting pins 34. A cotter key 35 is attached to pin 34 to retain base member 30 pivotally in position on brackets 26. To mount the towing hitch 10 in its towing position (as shown in FIGS. 1 and 4), each pivotal arm 50 is pivoted into alignment with the associated elongated bar 56, and locked in aligned position with pin 66 and cotter key 68. Latch pins 40 must be moved against the bias of spring 42, such that base member 30 will pivot with respect to brackets 26, to assume a generally horizontal orientation. The entire towing hitch 10 is freely pivotable at the connection between base member 30 and brackets 26, as shown by arrow 84 in FIG. 1. The hitch ball housing 72 may then be mounted on ball 18 so as t o connect the towed vehicle 14 to towing vehicle 12.

Figure 3:
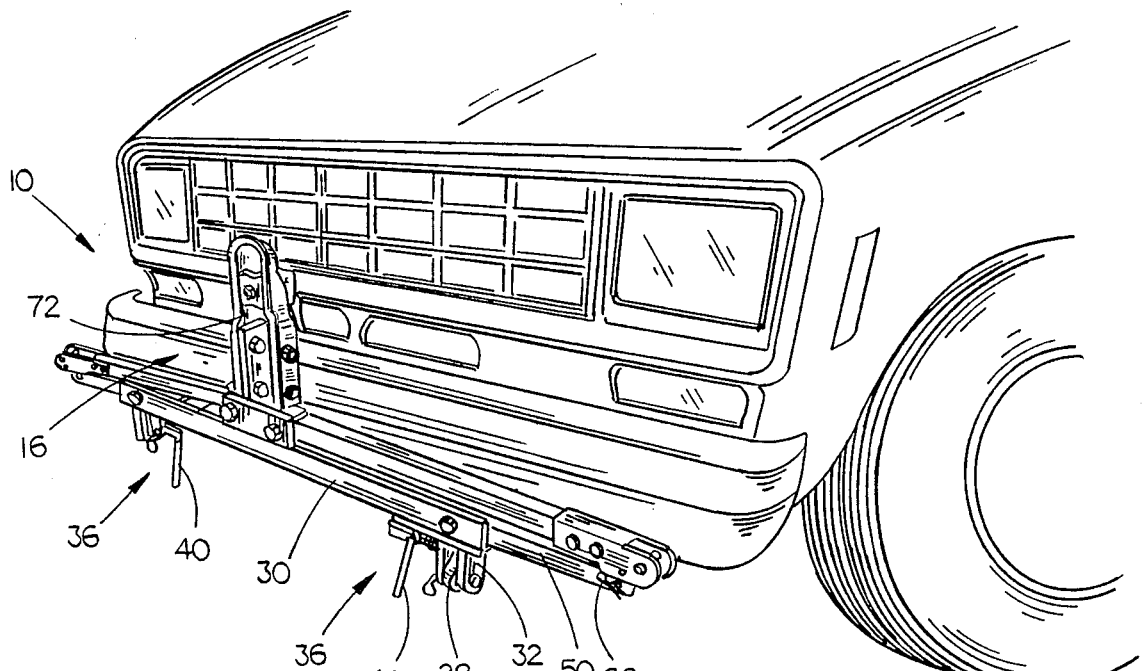
FIG. 3 is a perspective view of the forward end of a towed vehicle with the hitch of the present invention in a stored position.

When the user has reached his destination, the towing hitch may be moved into a storage position (shown in FIG. 3) such that the towed vehicle 14 may be utilized as desired without removing towing hitch 10 from the vehicle, and without the nuisance of the towing hitch projecting upwardly into the view of the driver. Towing hitch 10 may be collapsed into its storage position by initially removing locking pins 66 to allow pivotal arms 50 and elongated bars 56 to pivot with respect to each other. Forward portion 16 may then be moved rearwardly towards base member 30, as shown by arrow 86 in FIG. 4. As forward portion 16 approaches rearward portion 20, V-shaped notch 78 between plates 74 and 76 on alignment bracket 70 will approach plates 80 and 82 on base member 30 (see FIG. 5). In this fashion, plates 76 and 74 will contact and abut plates 80 and 82 when towing hitch 10 is in its storage position (see FIG. 6). Pins 66 may be temporarily stored in apertures 64 in pivotal arms 50, as shown in FIG. 3. Towing hitch 10, may then be moved into the storage position by pivoting the hitch ball housing 72 to a generally vertical position, wherein latch pins 40 will be received through apertures 44 in yoke brackets 32 and aperture 46 in projecting plates 28, so as to lock base member 30 to prevent further rotation in either direction (see FIGS. 2, 3 and 7). Because of the weight of forward portion 16, and the fit of plates 80 and 82 between plates 74 and 76 on alignment bracket 70, the towing hitch 10 will not move or rattle when in the storage position.

Figure 7:
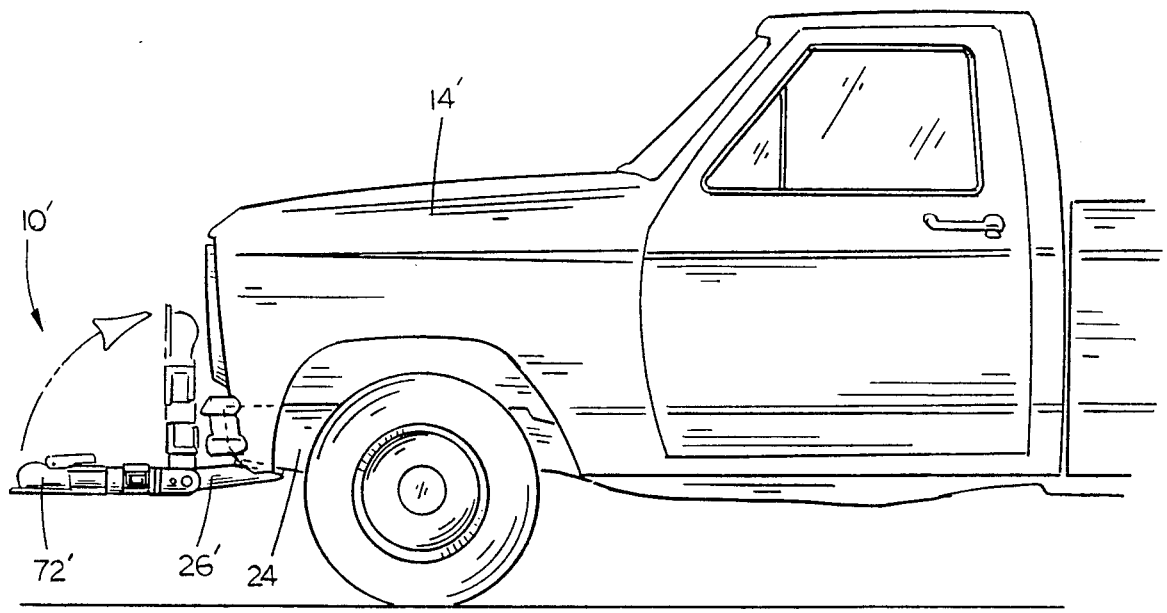
FIG. 7 is a side elevational view of a towed vehicle with the hitch collapsed into a storage position.

FIG. 7 shows the movement of ball hitch housing 72 from the generally horizontal towing orientation, to the generally vertically-oriented storage position. FIG. 7 also shows a different attachment of the towing hitch 10' to the towed vehicle 14'. In this embodiment, mounting brackets 26' extend forwardly from the vehicle frame 24 to provide support for towing hitch 10'.

Whereas the invention has been shown and described in connection with the preferred embodiments thereof, it will be understood that many modifications, substitutions and additions may be made which are within the intended broad scope of the appended claims. Thus, there has been shown and described an improved towing hitch which accomplishes at least all of the above stated objectives.

I claim:

1. A collapsible towing hitch, comprising:
mounting means attachable to a vehicle to be towed;
a base member pivotally mounted on said mounting means, for movement about a generally horizontal axis transverse to the direction of towing, said base member being pivotable between a storage position and a towing position, and said base member having first and second ends;
means on said base member for selectively locking said base member in the storage position;
a first arm member pivotally connected at a first end to said first end of said base member;
a second arm member pivotally connected at a first end to said second end of said base member;
said first and second arm members being pivotal within the same plane;
a first elongated bar member pivotally connected at a first end to the second end of said first arm member;
first hinge means pivotally connecting said first elongated bar member to said first arm member;
said first hinge means comprising:
a pair of parallel and spaced apart hinge plates affixed to and extending from the first end of said first bar member, each of said hinge plates having a first aperture formed therein;
a hinge collar mounted on the second end of said first arm member; and
a hinge pin journalled through said first apertures and said hinge collar to pivotably connect said first arm member to said first bar member;
means connected to said first arm member for selectively locking said first arm member and first bar member in axial alignment, comprising:
said first arm member having a hole therethrough adjacent to said second end;

each of said hinge plates of said first hinge means having a second aperture formed therein, said second apertures being coaxially aligned and adapted to register with said hole when said first bar member is axially aligned with said first arm member; and a locking pin selectively journalled through said second apertures and said hole when said first bar member is axially aligned with said first arm member to thereby selectively lock said first arm member and said first bar member in axial alignment;

a second elongated bar member pivotally connected at a first end to the second end of said second arm member for pivotal movement in the same plane as said second arm member;

second hinge means pivotally connecting said second elongated bar member to said second arm member;

said second hinge means comprising:

a pair of parallel and spaced apart hinge plates affixed to and extending from the first end of second bar member, each of said hinge plates having a first aperture formed therein;

a hinge collar mounted to the second end of said second arm member; and a hinge pin journalled through said first apertures and said hinge collar to pivotably connect said second arm member to said second bar member;

means connected to said second arm member for selectively locking said second arm member and second bar member in axial alignment, comprising:

said second arm member having a hole therethrough adjacent to said second end;

each of said hinge plates of said second hinge means having a second aperture formed therein, said second apertures being coaxially aligned and adapted to register with said hole when said second bar member is axially aligned with said second arm member; and a locking pin selectively journalled through said second aperture and said hole when said second bar member is axially aligned with said second arm member to thereby selectively lock said second arm member and said second bar member in axial alignment;

hitch mounting means pivotally connected between the second ends of said bar members, for operably mounting said collapsible towing hitch to a towing vehicle; and said hitch mounting means being selectively movable between an extended towing position, wherein said first arm and first bar and said second arm and second bar are locked in aligned orientation with said hitch mounting means spaced away from said base member, and a collapsed storage position, wherein said first arm and first bar and said second arm and second bar are pivoted with respect to each other so as to be generally parallel and with said hitch mounting means in close proximity to said base member.

2. The hitch of claim 1, wherein said mounting means includes:

first and second spaced apart bracket means having a generally vertically-oriented plate member projecting therefrom;

first and second yoke bracket means mounted on each end of said base member for pivotal connection to said first and second bracket means;

first pin means pivotally connecting said plate member of said first bracket to said first yoke bracket;

second pin means pivotally connecting said plate member on said second bracket to said second yoke bracket;

said first and second pin means being axial, such that said base member will pivot about an axis passing through said pin means.

3. The hitch of claim 2, wherein said means for selectively locking said base member in the storage position, includes:

latch pin means operably mounted on said base member adjacent said first yoke bracket;

said latch pin means including a slidable pin operable between an engaged position, extending through aligned apertures in said first yoke bracket and said first bracket means plate member, and a disengaged position wherein the apertures in said yoke bracket are not aligned with said aperture in said plate member;

said first yoke bracket being characterized as having apertures therethrough aligned with said latch pin; and said first bracket means plate member being characterized as having an aperture therein located so as to be aligned with said yoke bracket apertures when said base member is pivoted to its storage position.

4. The hitch of claim 3, wherein said latch pin is spring-loaded so as to be biased towards said yoke bracket apertures.

* * * * *